INVENTOR.
JAMES W. DES CHAMPS

INVENTOR.
JAMES W. DES CHAMPS
BY
Philip S. McLean
ATTORNEY

INVENTOR.
JAMES W. DES CHAMPS
BY
ATTORNEY

United States Patent Office 3,444,765
Patented May 20, 1969

3,444,765
CONTROL FOR FORWARD AND REVERSE DRIVE AND FOR ENGINE POWER, WITH SPECIAL ADJUSTMENTS FOR ENGINE IDLING AND ACCELERATION
James W. Des Champs, R.F.D. 4, Box 305, Sumter, S.C. 29150
Filed Nov. 2, 1967, Ser. No. 680,062
Int. Cl. G05g *13/04*
U.S. Cl. 74—876                                              6 Claims

ABSTRACT OF THE DISCLOSURE

Direction of movement and engine power controlled by a single handle having incorporated with it, rotational adjustment for setting the idling speed of the engine and push button adjustment for accelerating the engine independently of regular throttle adjustment.

FIG. 1, in the accompanying drawings illustrating present practical embodiments of the invention, is a plan view of one of the new combination controllers.

Figure 2:
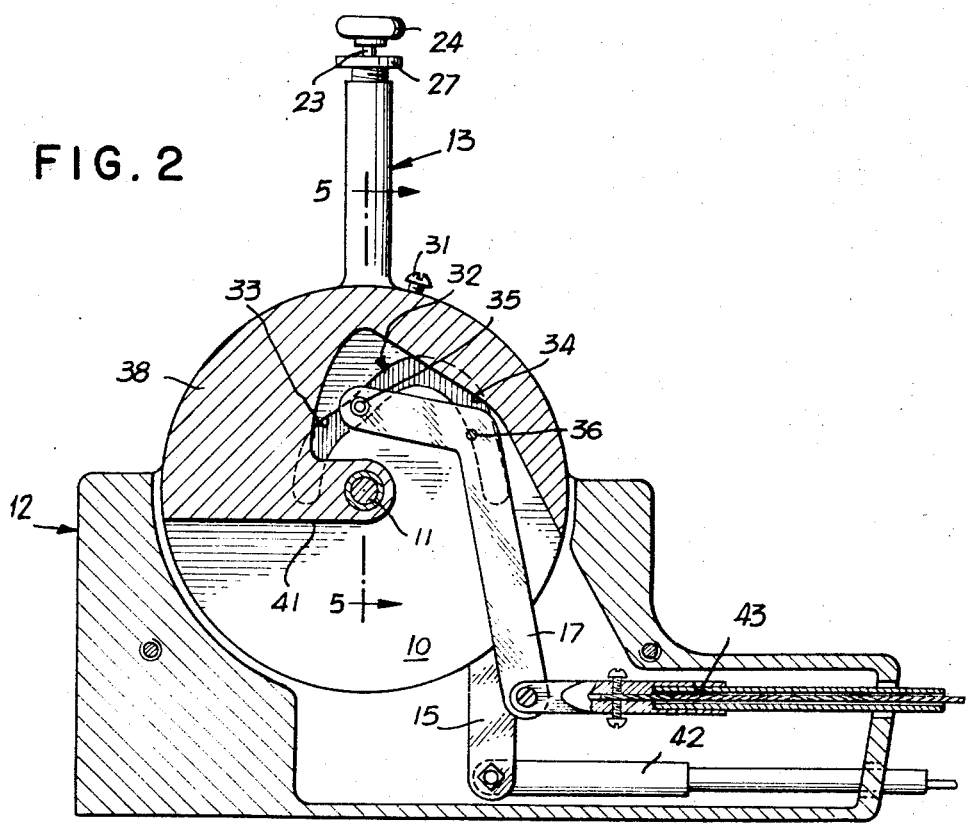
FIG. 2 is an upright sectional view on substantially the plane of line 2—2 of FIG. 1 showing the control parts in intermediate "NEUTRAL" position.

Basically the invention is illustrated as comprising a single cam structure 10, in the nature of of a disk, pivoted at 11, in a supporting housing 12, provided with a radially projecting tubular operating handle 13, and having a cam 14 on one side for a throttle operating lever 15 and a cam 16 on the opposite side for a gear shift operating lever 17.

A special feature of the throttle cam is that it is in the form of a block 18, slidable in a radially extensive pocket 19, in the face of the cam disk, having an inwardly directed C-shaped cam groove 20, engaged by cam follower 21, on the end of the bell crank form throttle lever 15, said cam block forced outwardly by springs 22 into engagement with the inner end of a rod 23, slidable in the handle and equipped with exposed push button 24.

Figure 1:
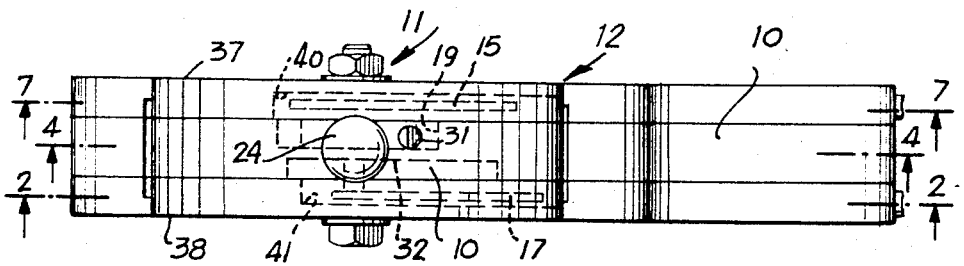
Figure 3:
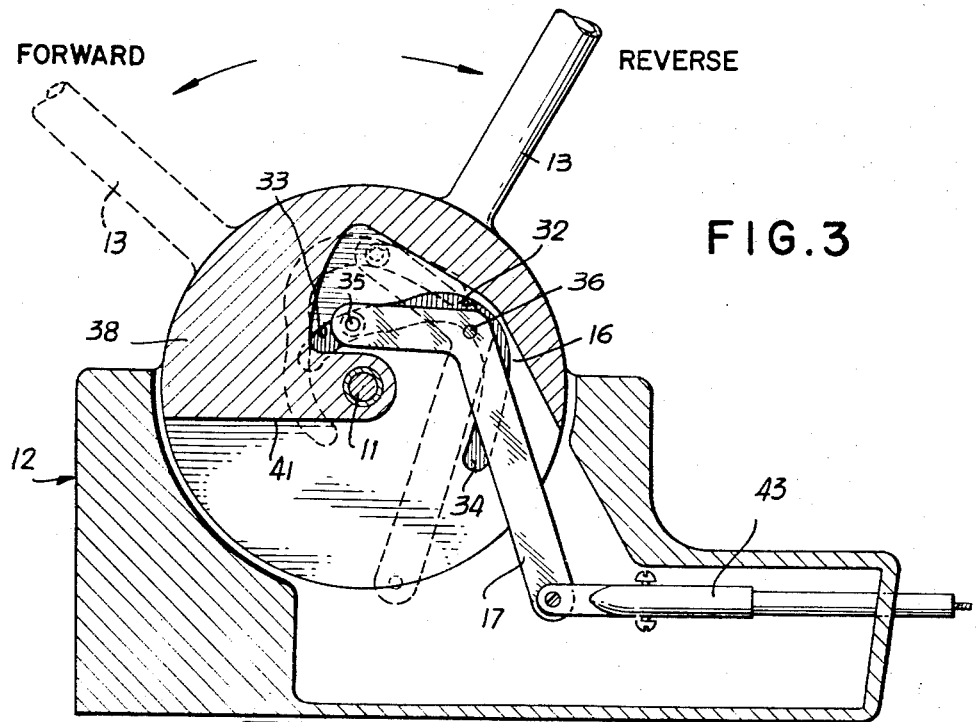
FIG. 3 is a similar view illustrating parts in broken lines in forward drive position and in full lines in reverse drive position.
Figure 4:
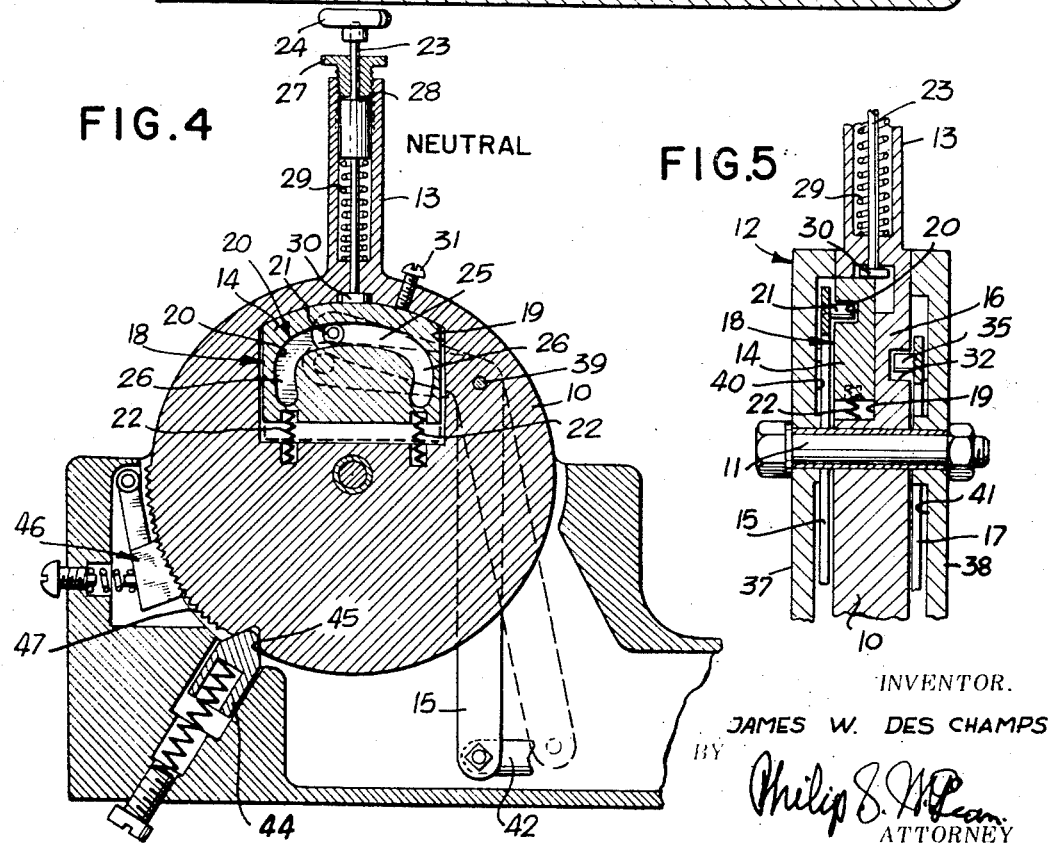
FIG. 4 is a sectional view on line 4—4 of FIG. 1 showing particularly the idling and accelerating adjustment means.
Figure 5:
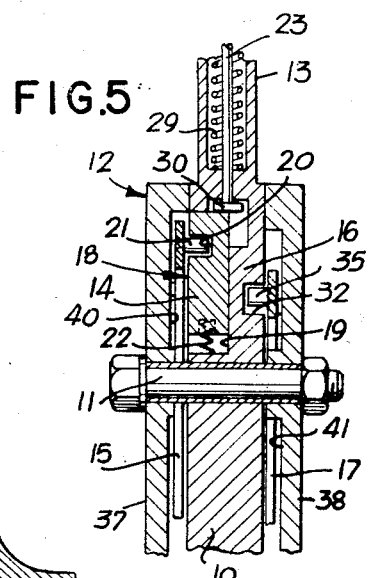
FIG. 5 is a sectional view across these special adjustment means, on substantially the plane of line 5—5 of FIG. 2.
Figure 6:
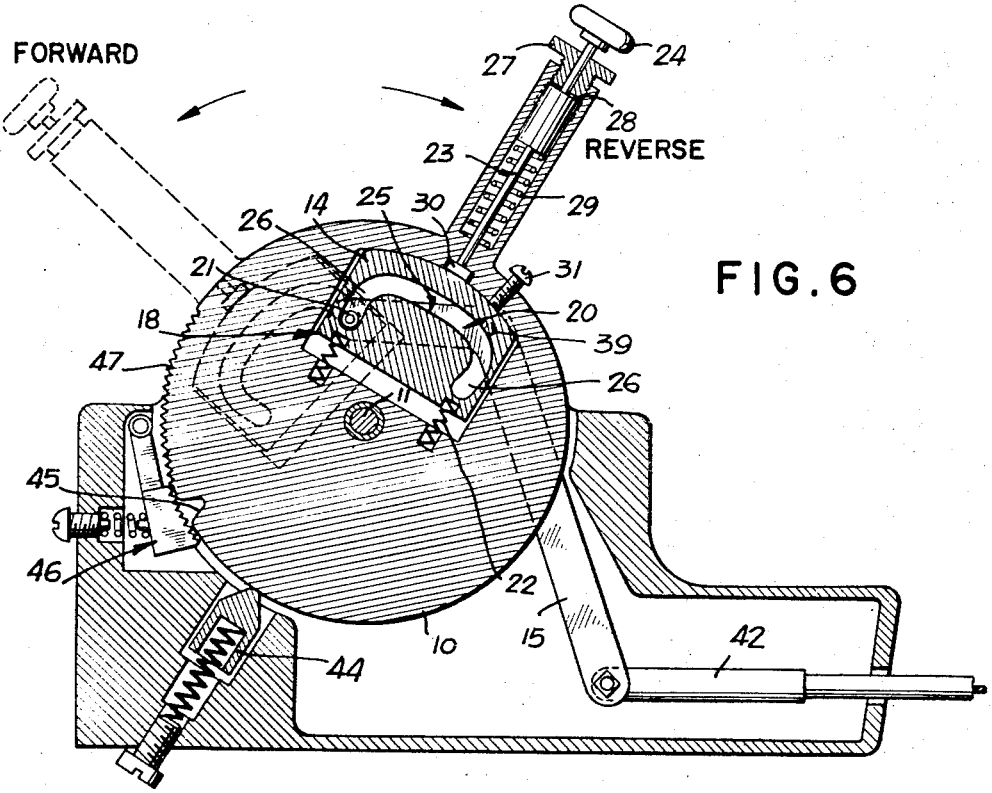
FIG. 6 is a sectional view similar to FIG. 4, showing reverse positions in full and forward positions in broken lines.
Figure 7:
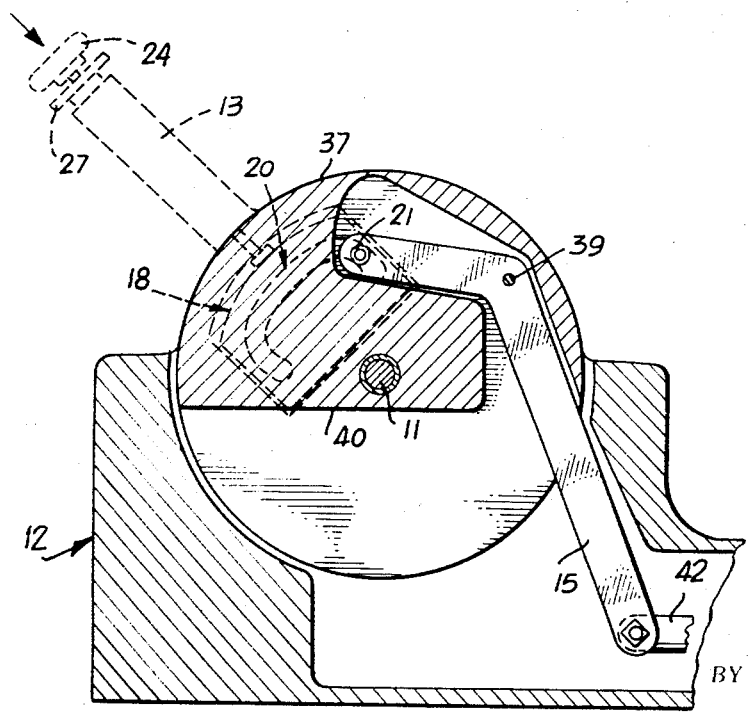
FIG. 7 is a sectional view on substantially the plane of line 7—7 of FIG. 1 showing forward full power position of parts.

The center portion 25 of the C-cam 18 is substantially concentric with the center of support 11, to hold the throttle lever in an intermediate neutral position with handle in the upright position, FIGS. 1 and 4, and with similar, inwardly extending end portions 26, to each shift the throttle lever to same, open position, FIGS. 6 and 7.

Inward adjustment of the cam block will advance throttle opening movement of lever 15 for either idling or accelerating purposes.

The push button operation provides instant acceleration.

For idling adjustment the push rod 23 is held to an inner position in the tubular handle by a gland nut 27, screwed in the outer end of the handle against a stop flange or shoulder 28 on the rod, the spring 29, in the inner end of the handle bearing against this flange to yieldingly hold the push rod extended to its outer position.

The inner end of the push rod is shown as carrying a flange or head 30 bearing on the slide cam and limiting outward adjustment or escape of the push rod.

Auxiliary idling adjustment or setting of the slide cam is provided for in the illustration by a set screw 31, positioned to bear on the outer edge of this cam. This screw provides a fine fixed setting for idling purposes and may be used alone or as companion to the gland nut setting of the push rod.

To avoid need for a screw driver or other tool to set this idling adjustment, the screw may have a hand knob form of head and be used off and on as an auxiliary or regular form of adjustment.

The forward and reverse gear shift cam 16 is shown as incorporating a cam groove having an intermediate concentric portion 32, and oppositely extending end portions 33, 34, FIG. 2, for neutral and forward and reverse positions of lever 17, having the follower 35 riding in that groove and which lever also is shown as of bell crank form pivotal 17 supported at the elbow at 36.

The casing or housing 12 is shown as made up with opposed side walls 37, 38, rotatably confining the control cam 10 and providing support for the pivot stud 11 and for the pivot centers 36 and 39 for the two cam levers 17 and 15.

These side walls are shown in FIGS. 2, 3, 5 and 7 as having cavities 40 and 41 in their inner faces providing clearance for the levers 15, 17, thus keeping thickness of the unit down to a minimum.

Connections extending from lever 15 to the throttle and form lever 17 to a gear set, clutch or the like, may be in the form of cables, rods, Bowden wires or the like. In the illustration, the cam lever 15 is shown as having adjustable connections 42 to extend to the throttle or engine control and the forward and reverse gear lever 17 is shown as having adjustable connections 43 to connect with the forward and reverse gear set.

As a safety precaution, the control unit is shown in FIG. 4 as equipped with a spring pressed dog 44, engageable in a notch 45 in the cam body placed to hold the cam in "NEUTRAL" position against vibration or possible accidental movement.

Also in that view there is shown a yielding spring detent 46, engageable with teeth 47 on the rim of the cam body to exercise a desired amount of restraint on normal adjustment of the control unit.

The two cams are so related or timed that the gear cam will complete the shift in opposite directions to forward or reverse before throttle opening movement of the other cam and so that both cams will hold to inactive gearing, engine idling in the NEUTRAL position.

The invention provides desired control of both engine and directional gearing, in a simple, inexpensive and small size unit which can be readily mounted and connected with the controlled parts and incorporating special control of engine idling and acceleration and safety in the normal operation of engine and gearing.

The location of the push button control for the engine on the shift handle is of particular value for maneuvering purposes, enabling the engine to be immediately adjusted while maneuvering for landing or other purposes, and for adjusting for special purposes, such as trolling and the like. These adjustments may all be made in neutral or in forward and reverse position and at any time the position of adjustment may be fixed, either by turning the gland nut stop means 27 or by adjusting the set screw 31.

While presently preferred features of the invention have been illustrated and described, it will be appreciated that various changes and modifications may be made all within the true intent and scope of the invention as herein defined and claimed.

What is claimed is:

1. Forward and reverse and engine control, comprising the combination of
    a rotatably mounted cam carrier having handle means for rocking the same in opposite directions from a "NEUTRAL" position to "FORWARD" and "REVERSE" positions,
    a cam block shiftable on said carrier in respect to said center of rotation,
    a cam track on said cam block for effecting engine power adjustment,
    a cam follower cooperatively engaging said cam track,
    engine control connections extending from said cam follower,
    manually controlled means for shifting said cam block on said cam carrier,
    a forward and reverse control cam on said carrier,
    a cam follower in engagement with said forward and reverse cam, and
    forward and reverse control connections extending from said last mentioned cam follower.

2. The invention according to claim 1 in which said handle means is a tubular extension of said cam carrier and in which said means for shifting said cam block is a push rod extending through said tubular handle into engagement with said cam block and spring means are provided for extending said push rod and for yieldingly holding said cam block in engagement with the inner end of said push rod.

3. The invention according to claim 2 with stop means for limiting extension of said push rod and in which said stop means is adjustable on said tubular handle to effect engine idling adjustment of the cam block.

4. The invention according to claim 1 with a set screw on the cam carrier, in engagement with said cam block for adjusting and holding the latter in engine idling position.

5. The invention according to claim 1 with a spring detent for yieldingly holding said cam carrier in the intermediate neutral position of the same and in which said carrier is provided with teeth on the periphery of the same and a spring detent is engaged with said toothed portion of the carrier for yieldingly holding the same in various positions of adjustment.

6. The invention according to claim 1 in which said cam carrier has a radially extending pocket in the peripheral portion of the same and in which said cam block is slidingly fitted in said pocket and in which said shifting means includes a plunger in said handle means in engagement at its inner end with said cam block.

References Cited

UNITED STATES PATENTS

| | | | |
|---|---|---|---|
| 2,957,352 | 10/1960 | Pierce | 74—876 |
| 3,131,575 | 5/1964 | Shimanckas | 74—876 |
| 3,134,269 | 5/1964 | Shimanckas | 74—876 |

ARTHUR T. McKEON, *Primary Examiner.*